United States Patent
Carrasco

(10) Patent No.: US 6,719,329 B2
(45) Date of Patent: Apr. 13, 2004

(54) SWIVEL HAVING A REDUCED PRESSURE AREA

(75) Inventor: Antoine Carrasco, Eze sur Mer (FR)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 10/093,483

(22) Filed: Mar. 11, 2002

(65) Prior Publication Data

US 2002/0117848 A1 Aug. 29, 2002

Related U.S. Application Data

(63) Continuation of application No. 09/380,961, filed as application No. PCT/IB98/00619 on Mar. 13, 1998, now Pat. No. 6,354,633.

(30) Foreign Application Priority Data

Mar. 14, 1997 (EP) .............................................. 97200769

(51) Int. Cl.⁷ ............................. F16L 27/00; F16L 39/04
(52) U.S. Cl. ................................. 285/121.3; 285/121.5; 285/121.6; 285/121.4; 285/272; 285/190
(58) Field of Search ........................... 285/121.3, 121.5, 285/98, 134, 136.1, 190, 124.5, 124.1, 205, 121.6, 272

(56) References Cited

U.S. PATENT DOCUMENTS

| | | |
|---|---|---|
| 4,045,059 A | 8/1977 | Smith |
| 4,183,559 A | 1/1980 | Stafford et al. |
| 4,288,106 A | 9/1981 | Foolen |
| 4,306,741 A | 12/1981 | Foolen |
| 4,405,162 A | 9/1983 | Williams |
| 4,535,938 A * | 8/1985 | Lindabury .................. 239/269 |
| 4,602,806 A * | 7/1986 | Saliger .......................... 285/41 |
| 4,662,657 A | 5/1987 | Harvey et al. |
| 4,756,559 A * | 7/1988 | Shimada et al. ......... 285/121.6 |
| 4,781,404 A * | 11/1988 | Tharp et al. .................. 285/94 |
| 4,819,966 A * | 4/1989 | Gibb ........................... 285/106 |
| 4,828,292 A | 5/1989 | Jansen |
| 5,071,171 A | 12/1991 | Perratone |
| 5,242,198 A | 9/1993 | Pollack |
| 5,312,140 A | 5/1994 | Pollack |
| 5,411,298 A | 5/1995 | Pollack |
| 5,797,413 A * | 8/1998 | Pollack .......................... 137/1 |
| 6,073,777 A | 6/2000 | Jansen |

FOREIGN PATENT DOCUMENTS

| | | |
|---|---|---|
| CH | 483 584 | 12/1969 |
| DE | 879827 | * 10/1961 |
| EP | 0 013 454 | 7/1980 |
| EP | 0 013 455 | 7/1980 |
| FR | 823720 | * 1/1938 |
| GB | 2 035 493 | 6/1980 |
| GB | 2 201 474 | 9/1988 |

* cited by examiner

Primary Examiner—Robert J. Sandy
Assistant Examiner—Carlos Lugo
(74) Attorney, Agent, or Firm—Young & Thompson

(57) ABSTRACT

A high pressure swivel includes an inner and an outer wall. Each annular wall is connected to a respective distribution member via apertures which have an axial dimension which is smaller than the diameter of the inlet or outlet. In this way, the pressure area between the seals of the inner and outer rotatable walls is reduced. Each distribution member may include a chamber that is defined by the external surface of the inner and outer annular walls, and an enclosing wall. In this way, an effective thermal isolation is provided by the distribution chambers adjacent to the external surfaces of the inner and outer rings. Deformation of the distribution chambers of the swivel will tend to decrease the width of the seal extrusion gap.

8 Claims, 8 Drawing Sheets

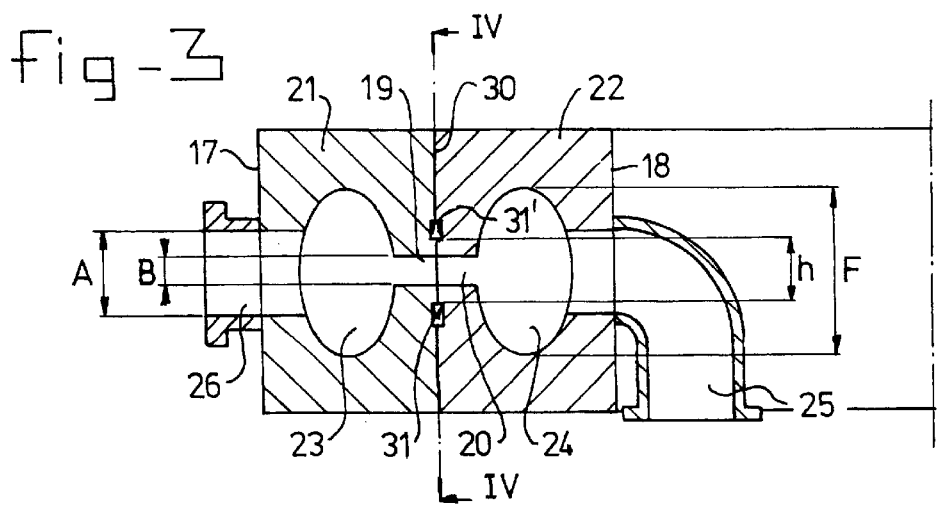
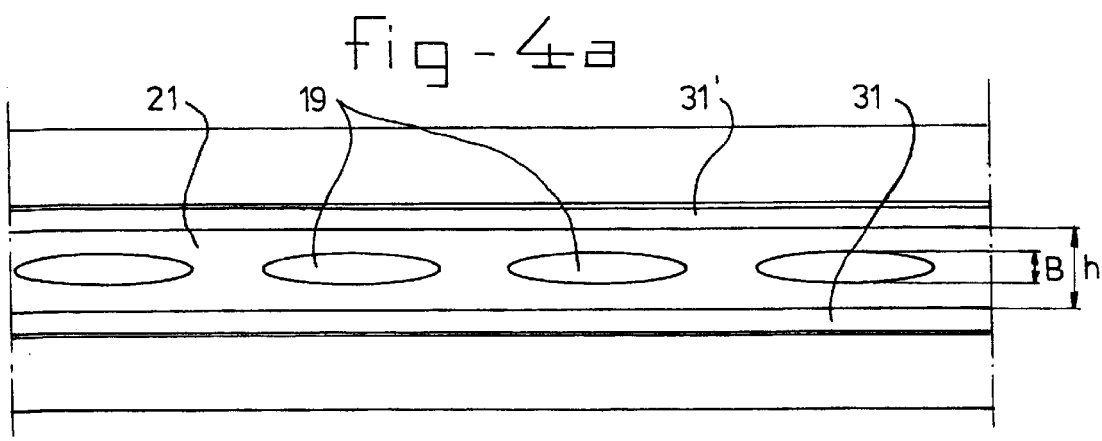
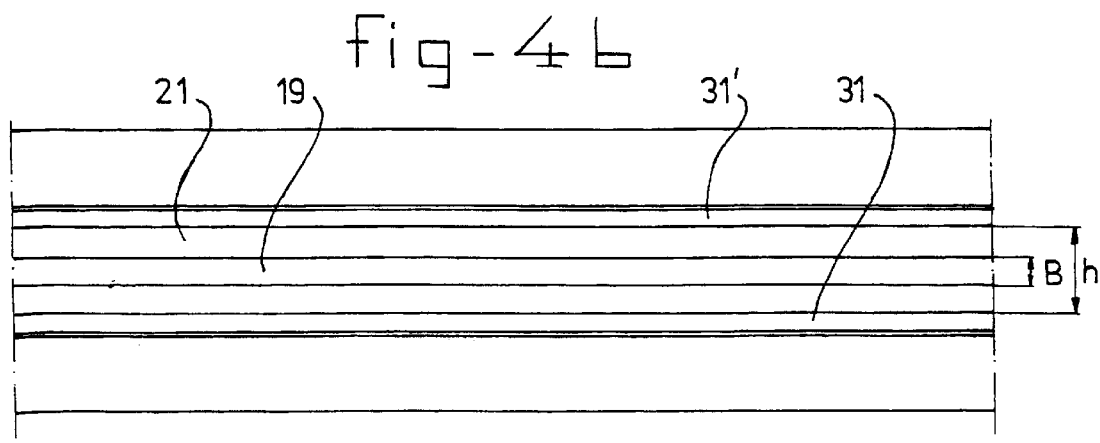

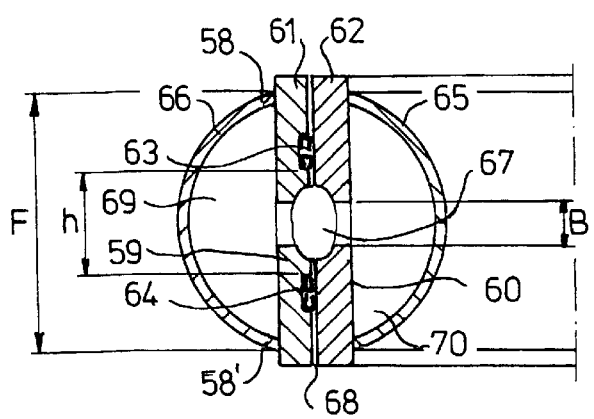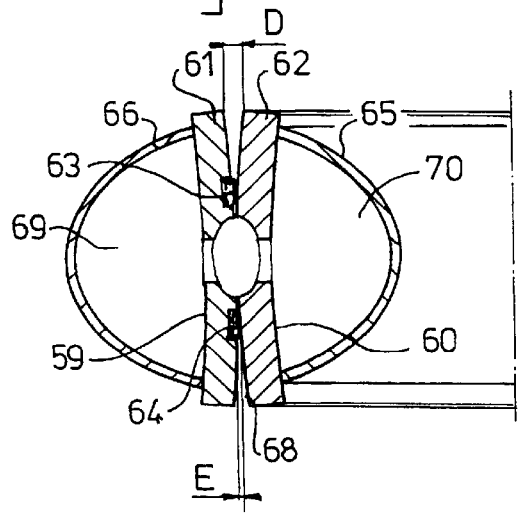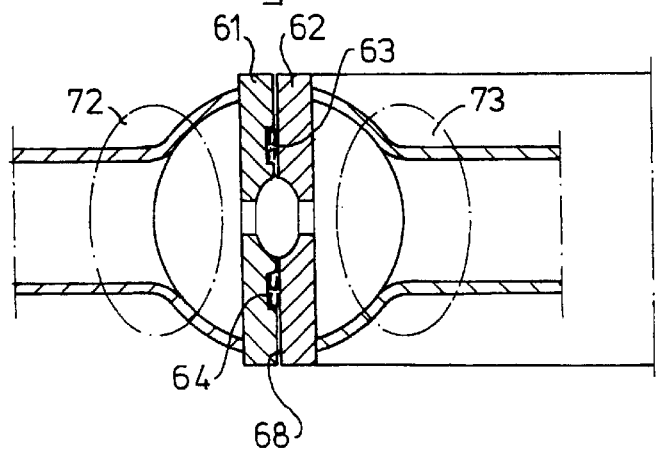

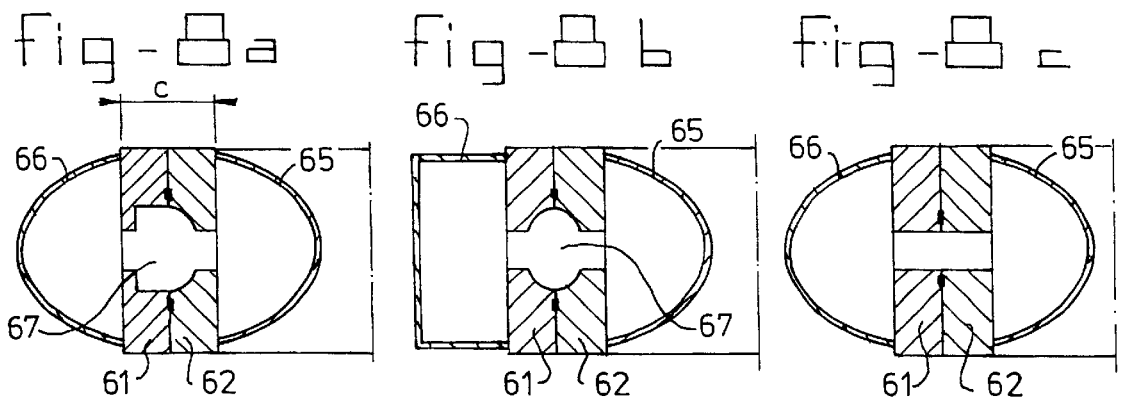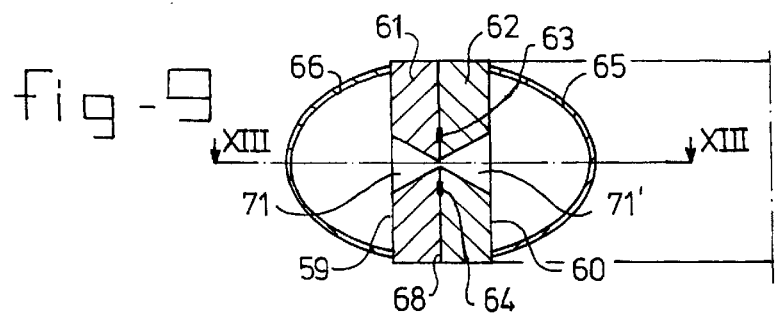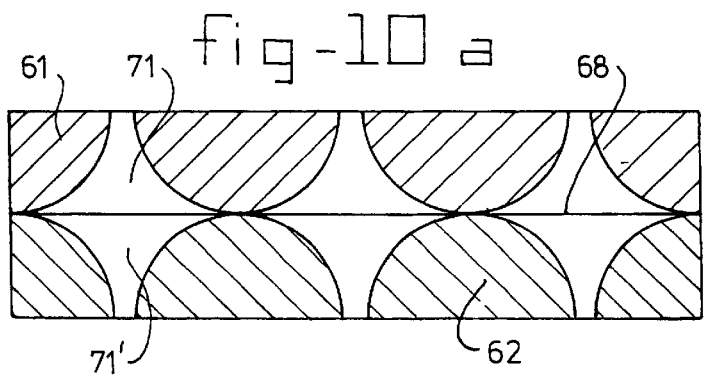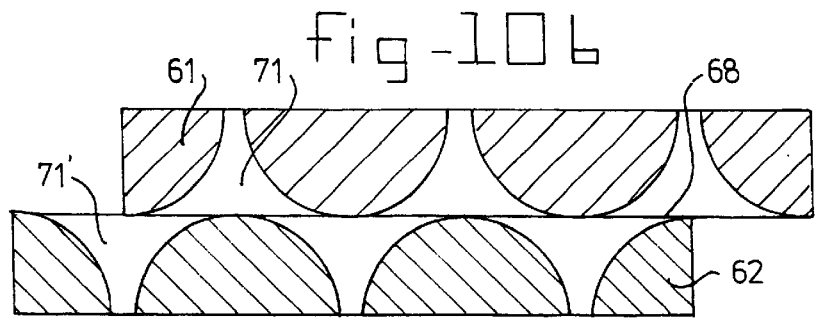

SWIVEL HAVING A REDUCED PRESSURE AREA

This application is a continuation division of application Ser. No. 09/380,961, filed on Oct. 7, 1999, now U.S. Pat. No. 6,354,633. application Ser. No. 09/380,961 is the national phase of PCT International Application No. PCT/IB98/00619 filed on Mar. 13, 1998 under 35 USC §371. The entire contents of each of the above-identified applications are hereby incorporated by reference.

FIELD OF THE INVENTION

The invention relates to a high pressure swivel comprising an inner annular wall and an outer annular wall concentric with said inner wall and rotatable relative to said inner wall. Each annular wall has an outer surface and an inner surface and comprises an aperture extending in a radial direction from the inner surface towards the outer surface. The apertures in the walls are in mutual fluid communication, the inner surfaces of the walls facing each other in close proximity and defining an annular gap extending in an axial direction on each side of the apertures. At least one flexible sealing element is comprised in the annular gap on each side of the aperture in each annular wall. The apertures are respectively in fluid communication with a fluid inlet or a fluid outlet.

BACKGROUND OF THE INVENTION

Such high pressure swivels are known from EP-B-0013454 and EP-B-0013455. For the purpose of the present invention the term "high pressure" is intended to include pressures of about 50 bar and higher. In the known high pressure swivels, a toroidal chamber is defined between the inner, stationary annular wall, or ring, of the swivel and the outer annular wall or ring. In the following description the terms "annular walls" and "rings" will be used in an interchangeable manner. Conduits which convey high pressure hydrocarbons such as oil or gas at pressures of between 100 and 300 bar, extend through the central space of the inner, stationary ring. Through the inlets of the inner ring, the conduits connect to the toroidal chamber. The rotating outer ring that defines one half of the toroidal chamber, comprising one or more outlets that are connected to said toroidal chamber. On either side of the toroidal chamber of the known swivels, the sealing elements are located in the annular gap, also called the "seal extrusion gap".

The sealing of swivels handling liquids or crude oils with limited gas content is achieved with a double sealing arrangement on either side of the toroidal chamber. The so-called primary seals are positioned closest to the toroidal chamber and carry the full pressure, while the secondary seals are positioned behind the primary seals to back-up the primary sealing function in an event of primary seal rupture.

The sealing of gas or crude with high gas content is more difficult due to the low viscosity of the gas and the danger of fire and explosions in case of leakage. Therefore, for such an application a different sealing concept is used. The primary seals are replaced by two pairs of seals facing each other. Within these two pairs of seals, a barrier of liquid is maintained at a higher pressure than the gas to be sealed, such that an absolute gas tightness is achieved. Leakages of seals in this configuration will only result in internal leakages of the barrier liquid to the gas line or to a leak recuperation tank.

Defects in the known swivels occur when the width of the annular gap in which the seals are located exceeds a certain level such that the seals are extruded from the annular gap by the high pressure acting upon them. The design of the known swivels has concentrated on minimizing the seal extrusion gap opening. On the other hand, a minimum gap width must be maintained such that deflections of the inner and outer rings of the swivel will not cause the two parts to contact one another and do thus prevent rotation. In order to minimize the deformations of the inner and outer ring due to pressure effects, the known rings are made of cast steel, with a wall thickness of about 240 mm for a 2 m diameter swivel. Deformations are prevented by the heavy masses of the inner and outer rings. A single swivel of a seal diameter of 1980 milimeters suitable for operating at pressures of 100 bar may weigh 20 tons or more.

Not only should the deformations of the inner and outer rings be minimized, but known swivels are also designed in such a way that stresses remain within the limits which are imposed by the Pressure Vessel Codes. The known swivel units are often stacked one on top of the other. The hydrocarbons supplied to the swivels often have temperatures between 20 and 120° C. During transfer of these fluids, the outer ring of the swivel is cooled by the external ambient air, whereas the inner ring remains relatively hot. This is especially so when the swivel is exposed to outside weather conditions and when a wind blows against a swivel stack. The temperature difference between the concentric rings of the swivel generates deformations of the extrusion gap as the inner ring expands more than the outer ring. To avoid contact between the rotating parts of the swivel due to temperature fluctuations, when a pressure drop occurs, the initial extrusion gap should be wide enough to accommodate these temperature deformations. The width of the initial extrusion gap that is required to accommodate the thermal deformations reduces the allowable deformations due to pressurization.

In order to minimize the variations in the extrusion gap dimensions due to temperature effects, the outer ring of the swivel is often insulated by a suitable insulating material such as rubber. These insulations often cause problems as the design of the swivel stack becomes more complicated and inspection of the swivel unit becomes difficult.

Finally, to further increase the stiffness of the inner and outer rings in the areas of the inlets and outlets, reinforcements are attached to the inner and outer rings around the inlets and outlets of the known swivels. These reinforcements again add to the weight of the swivel.

It is therefore an object of the present invention to provide a high pressure swivel which is relatively insensitive to pressure variations and which can transfer high pressure fluids while using a relatively light weight construction.

It is a further object of the present invention to provide a swivel for transferring high pressure fluids, in which temperature fluctuations of the inner and outer ring are reduced.

It is a further object of the present invention to provide a swivel which can be combined with other swivels of similar shape in a number of different configurations.

It is again an object of the present invention to provide a swivel which is of a relatively small size, which is of a simple construction, which is relatively maintenance free and which can be easily manufactured at relatively low cost.

SUMMARY OF THE INVENTION

Thereto the swivel according to the present invention is characterized in that the apertures in the inner and the outer annular walls are connected to the fluid inlet or the fluid outlet via a respective first and second distribution member, the apertures having a smaller axial dimension than the diameter of the fluid inlet and/or the fluid outlet.

Because the axial dimension of each aperture in the inner and outer ring is significantly reduced compared to the dimensions of the fluid inlet and the fluid outlet, the pressure area between the sealing elements, on which the forces act that tend to separate the inner and the outer rings, is also significantly decreased in size. In this way a very small size and light weight swivel can be constructed. The invention is based on the principle of connecting two relatively big pressure vessels, formed by the inlet and the outlet, via the distribution members, to a rotatable connecting element (inner and outer annular walls) of reduced pressure area. Thereby, the forces on the connecting element remain limited and this element can consequently be constructed with reduced dimensions. The distribution members may be formed by a plurality of individual conduits, by distribution chambers or by a combination thereof.

In one embodiment, the apertures have a smaller axial dimension than the axial dimension of the distribution members. In this way, fluids are passed to the relatively large size distribution members for distribution of the fluids towards or away from the apertures along the circumference of the inner and outer rings.

In another embodiment of a swivel according to the present invention, each annular wall comprises a plurality of apertures distributed along its circumference, each aperture having a smaller throughflow area than the fluid inlet and the fluid outlet. Because the plurality of apertures around the circumference of the inner and outer annular walls of the swivel according to the present invention, the throughflow areas of the inlet and outlet are distributed, via the distribution members, over N smaller subareas, for N apertures.

The inner and outer rings of the swivel according to the present invention may comprise a central toroidal chamber which can be of rectangular, oval or circular cross-section. It is however also possible for the inner and outer ring to comprise a single slot or a number of slots extending along the circumference of each ring, the slots of the inner and outer ring being distributed in such a way that always a number of slots of the inner and outer ring are overlapping for any relative rotational position of the inner and outer ring. In a further embodiment the parts of annular walls and of the first and second distribution members that in an axial direction are located between the sealing elements and in a radial direction are located between the outer surfaces of the annular walls, are substantially symmetric with respect to the annular gap. Due to the substantially symmetric arrangement of the swivel around the pressure area, instabilities caused by the pressure fluctuations are prevented, and the swivel is made especially suitable for use at pressures above 50 bar.

The distribution members according to the present invention can be formed by a number of pipes connected to each aperture in the inner and outer ring. The distribution members are preferably concentric with the inner and outer rings, but need not be. It is for instance possible that the inlet and the outlet are connected to the apertures in the inner and outer rings of the swivel by means of a plurality of flexible or rigid conduits. In one embodiment of the swivel according to the present invention, each distribution member comprises a distribution chamber and a number of distribution ducts. Each distribution duct is on one side connected to a respective opening in the rings and is on its other side connected to a distribution chamber. The distribution chambers are connected to the fluid inlet or the fluid outlet and have a throughflow area which corresponds to the throughflow area of the fluid inlet or the fluid outlet to which the respective chamber is connected. Preferably the distribution chambers are toroidal, one chamber being disposed within the inner annular wall and the other chamber being disposed around the outer annular wall of the swivel. In the above construction, deformations that are caused by the fluid pressure in the concentric distribution chambers, are less than for the inner and outer annular walls of the swivel, and hence help to minimize the seal extrusion gap.

Furthermore, by the concentric configuration a heat barrier is placed around each annular wall of the swivel, such that temperature fluctuations of the annular walls are minimized.

In addition, due to the larger number of relatively small apertures in the inner and outer annular walls of the swivel, the structure remains relatively rigid. The weakening effects of the relatively large size throughflow areas of the inlets and the outlets are minimized because the inlets and outlets are located at a relatively large radial distance from the annular gap carrying the seals. Hence deformations that normally would occur due to the large sized opening in the annular walls of known swivels, are minimized.

Finally, the construction according to the present invention is to a large extent symmetrical with respect to the extrusion gap, such that it is self balanced and distortions due to pressure are minimized thereby.

It should be noted that a two-fluid swivel for low pressure applications is known from the article "Single Point Mooring", by Roger Maari, 1985, printed in Monaco, page 182, ISBN 2-9500554-0-0). In this known construction, hydrocarbons are distributed from an inlet duct to a central chamber located within the inner annular ring and from there, through apertures in the inner annular wall. Via apertures in the outer annular wall, the fluids reach an outer ring-shaped distribution chamber which connects to the fluid outlet. The inner surfaces of the annular walls of the known outlet are not in close proximity, such that a narrow annular gap (seal extrusion gap) between these surfaces is not formed. Furthermore, the known construction is asymmetric in the areas near the openings in the inner and outer annular wall. The construction is therefore unsuitable for high pressure purposes. Moreover, the known structure is relatively complex and of a large size. The known swivel can not be combined into a vertical or concentric assembly.

A highly preferred embodiment of the swivel according to the present invention comprises two distribution chambers concentric with the annular walls. A first distribution chamber is disposed radially inwardly from the inner annular wall and a second distribution chamber is disposed radially outwardly from the outer annular wall. Each distribution chamber is enclosed by an annular section of the outer surface of the respective annular wall and by an enclosing wall. This enclosing wall is with a first and second end connected to the outer surface of the respective annular wall in a fluid tight manner, axially outwardly from the apertures in the annular wall. In this way, the distributions chambers are directly attached to each annular wall. It is preferred that the distribution chambers are placed along the majority of the height of the annular rings of the swivel. Temperature variations of the rings are best prevented by distribution chambers extending along substantially the height of the inner and outer rings. Furthermore, distortions of each annular chamber according to this preferred embodiment are transferred to the annular walls of the swivel in such a way that the extrusion gap at the position of the seals is narrowed.

Hence a self-closing effect takes place. It is preferred that the distribution chambers are substantially of circular cross-section, such that distortions under pressure are minimized.

Finally, It has appeared that the distribution chambers according to the present invention reduce deposit of sand and debris on the seals. Most of the debris will be caught in the first distribution chamber connected to the inlet. Hereby the seal life can be extended.

The swivel concept according to the present invention allows a thin-walled construction which can be produced using curved pipe sections and plates that are welded together. Thereby heavy castings can be avoided such that a cheap and light weight swivel is obtained.

Due to its substantially reduced weight, the swivel assembly according to the invention can not only be easily stacked in a vertical assembly, but can also be placed in a concentric configuration. For comparison, a known swivel having fluid inlets and outlets with a 12 inch diameter a seal diameter of 1980 millimeters and a maximum operating pressure at 100 bars of a standard "piston seal" design and made according to conventional casting technology, has a weight of approximately 20 tons and a maximum extrusion gap opening under pressure of 0,35 millimeters. A swivel having same characteristics and made according to the present invention has a weight of 7 tons and having a maximum extrusion gap at the primary seals of 0.14 millimeters. This small extrusion gap allows a pressure increase by a factor of 2 compared to the known swivel construction at a third of the weight of the known construction.

BRIEF DESCRIPTION OF THE DRAWINGS

A number of embodiments of the swivel according to the present invention will be explained in detail, by way of example, with reference to the accompanying drawings. In the drawings:

FIG. 3 shows a schematic, cross-sectional view of the principle on which the present invention is based, in an axial plane.

FIGS. 4a and 4b each show a cross-sectional view of the outer ring in FIG. 3 along the line IV—IV in FIG. 3, of alternative configurations of the apertures in the outer ring.

FIGS. 7a–7c schematically show the pressure and temperature effects on the swivel embodiment of FIGS. 5 and 6.

FIGS. 8a–8c show alternative arrangements of a swivel of the type as shown in FIGS. 5, 6 and 7, wherein the distribution chambers are directly connected to the inner and outer rings.

FIG. 9 shows a further embodiment of a swivel wherein the distribution chambers are directly connected to the inner and outer rings, the apertures in the rings having a non-uniform axial dimension.

FIGS. 10a and 10b show a cross-sectional view of the embodiment according to FIG. 9 along the line XIII—XIII, for different relative positions of the inner and outer rings.

DETAILED DESCRIPTION OF THE INVENTION

Figure 1:
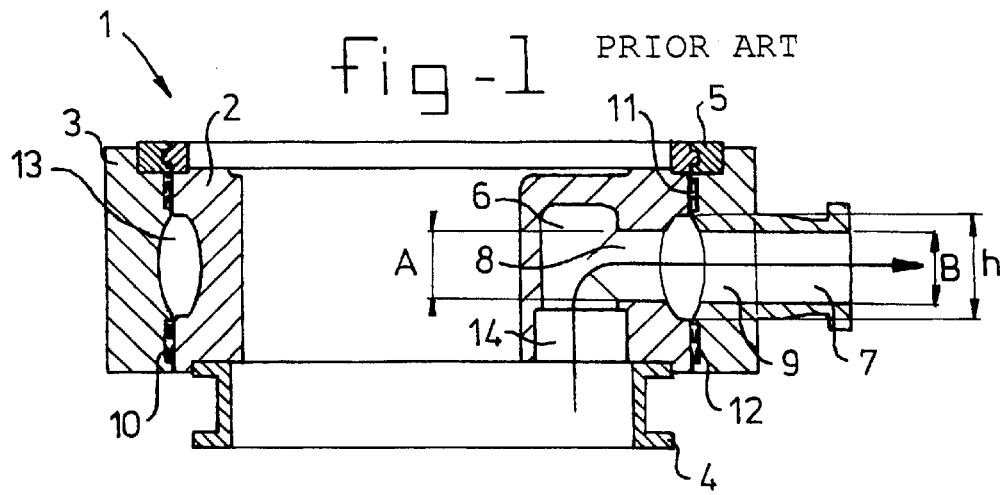
FIG. 1 shows a cross-sectional view of a known swivel in an axial plane.

FIG. 1 shows an axial cross-section of a known swivel 1 which comprises an inner annular wall 2 and concentric therewith an outer annular wall, or ring 3. The inner ring 2 is stationary and is connected to a fixed support 4. The outer ring 3 is rotatable with respect to the inner ring 2 and is supported on the inner ring 2 by a roller bearing 5. In this case, the inner ring 2 comprises an aperture B extending through the thickness of the ring and connecting to fluid duct 14. The outer ring 3 comprises an aperture 9. The axial dimension of the apertures 8, 9 is indicated as B. The apertures 8, 9, are in fluid communication with a central toroidal chamber 13 which is defined between the stationary inner ring 2 and the rotating outer ring 3. The term "toroidal" is used herein to define a generally ring-shaped chamber which can be of circular, elliptical, square or any other cross-sectional shape.

The aperture 8 of the inner ring is connected to an inlet 6 for high pressure hydrocarbons. The hydrocarbons are distributed from the inlet 6, via the aperture B and the toroidal chamber 13, to the outlet 7 as indicated by the arrow. The diameter A of the inlets and outlets 6, 7 equals the axial dimension B of the apertures 8, 9.

Figure 2:
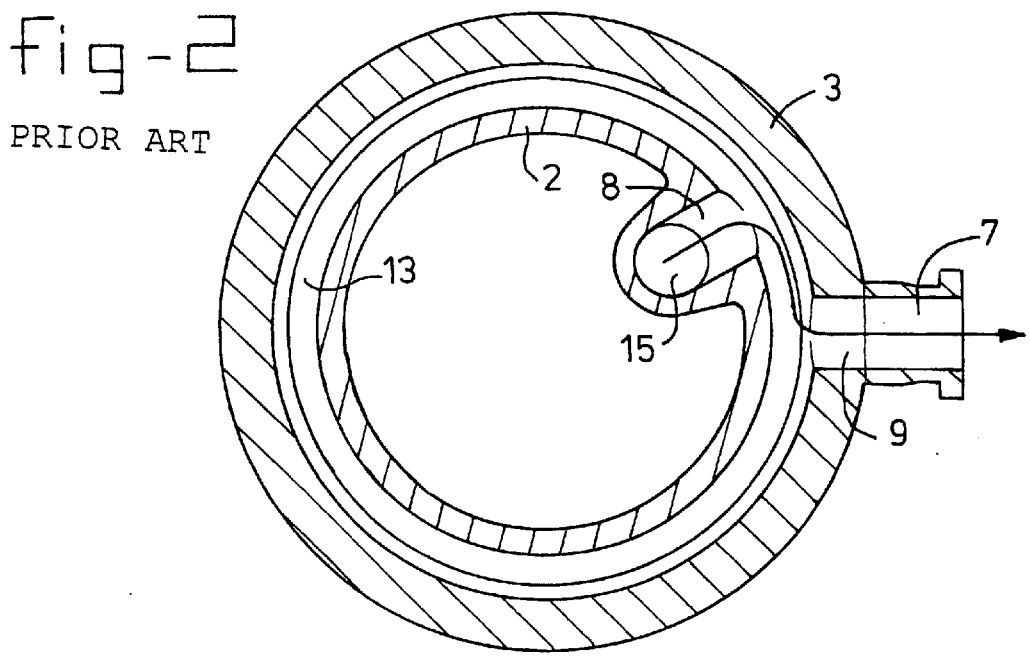
FIG. 2 shows a cross-sectional view of the known swivel of FIG. 1 in a radial plane.

On each side of the toroidal chamber 13, an axial gap 10 is comprised between the inner ring 2 and the outer ring 3, which gap may have a width of for instance 0,35 millimeters. In the gap 10, on each side of the chamber 13, sealing elements 11, 12 are placed such as for instance a dual sealing system. As shown in FIG. 2, the throughflow area 15 of the inlet 6 is of equal size as the throughflow area of the aperture 8 in the inner ring 2, and the aperture 9 in the outer ring 3.

In the known swivel, the pressure area on which forces act which tend to separate the inner ring 2 and the outer ring 3, corresponds to the distance between the seals 11, 12 (indicated in FIG. 1 with h) times the circumference of the seals in the gap 10. In the known construction, the distance h between the seals 11, 12 is larger than the diameter A of the inlets and outlets 6, 7 and the dimension B of the apertures 8, 9.

The inner ring 2 of the known swivel 1 acts as a thick shell under external pressure whereas the outer ring 3 acts as a thick shell under internal pressure.

The radial deformations, $\Delta R$, of the two rings 2, 3 are roughly described by the following relationship:

$$\Delta R \approx \frac{\text{pressure} \cdot R^2}{E \cdot t}$$

Herein, t is the radial thickness of the rings 2, 3, R is the radius of the rings 2 and 3, and E is the Young modulus of the material. To minimize deformations at a given pressure and a given radius, the thickness of the rings t or the Young modulus E can be increased. This shows the weakness in the known high pressure swivel design: the thickness of the annular walls 2, 3 increases linearly with pressure and increases with the square of the radius. Therefore, the pressure limit for a Duplex stainless steel swivel with a two meter diameter, is about 100 bar. This limit is dictated by the maximum weight that foundries can cast or forge.

The extrusion gap 10 of the known swivel 1, is further affected by temperature fluctuations due to the different heating and cooling behaviour of the inner ring 2 and the outer ring 3.

Finally, the relatively large apertures 8, 9 in the inner and outer rings weaken the annular walls 2, 3. Thereby, the seals 11, 12 and the gap 10 are affected by deformations around the apertures 8, 9. Reinforcements around the apertures should limit these deformations in the known swivel design.

FIG. 3 schematically shows the basic concept on which the present invention is based. The inlet 25 is at the outer surface 18 connected to distribution chamber 24 of the stationary inner ring 22. Via an aperture 20, fluid can pass from the distribution chamber 24 via the extrusion gap 30 to aperture 19, which is connected to the distribution chamber 23 in the rotating outer ring 21. From the distribution chamber 23, fluid can pass to the outlet 26 on the outer surface 17 of the outer ring 21. It can be seen that the axial dimension B of the apertures 19, 20 is substantially reduced compared to the axial dimension A of the inlets and outlets 25, 26 and also compared to the axial dimension F of the distribution chambers 23–24. Hereby the pressure area on which the forces act that tend to separate the rings 21 and 22 is substantially reduced. In this manner, the seals 31, 31' can be located only a small distance apart and the distance h between the seals 31, 31' can be minimized.

As is used herein, the term "axial" refers to the direction parallel to the direction of the annular gap 30, irrespective of the orientation of the rings 21, 22. The annular gap 30 may for instance be placed in a vertical direction, or a horizontal direction.

As shown in FIG. 4a, the apertures 19 (and 20) may be formed by a plurality of individual apertures spaced along the circumference of the outer ring 21 (and inner ring 22). As shown in FIG. 4b, the apertures 19 (and 20) may also be formed by a continuous slot extending along the total circumference of the inner and outer rings 21, 22. In this construction, the stiffness will be reduced with respect to the construction shown in FIG. 4a, and the inner and outer rings 21, 22 will in this case have to be either reinforced or made of a relatively thick material.

Figure 5:
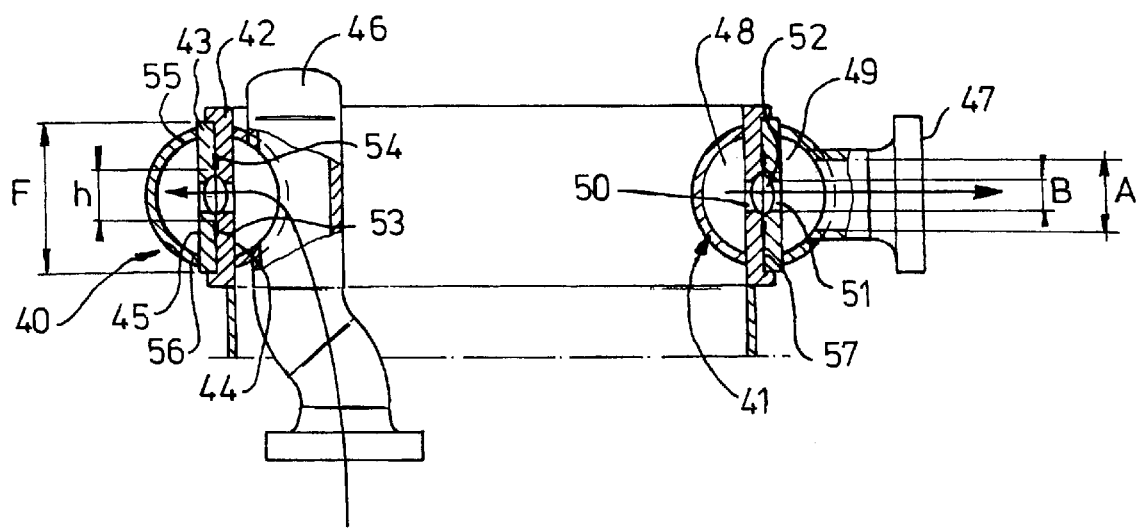
FIG. 5 shows a cross-sectional view in an axial plane of a highly preferred embodiment of a swivel according to the present invention, wherein the distribution chambers are directly connected to the inner and outer rings.
Figure 6:
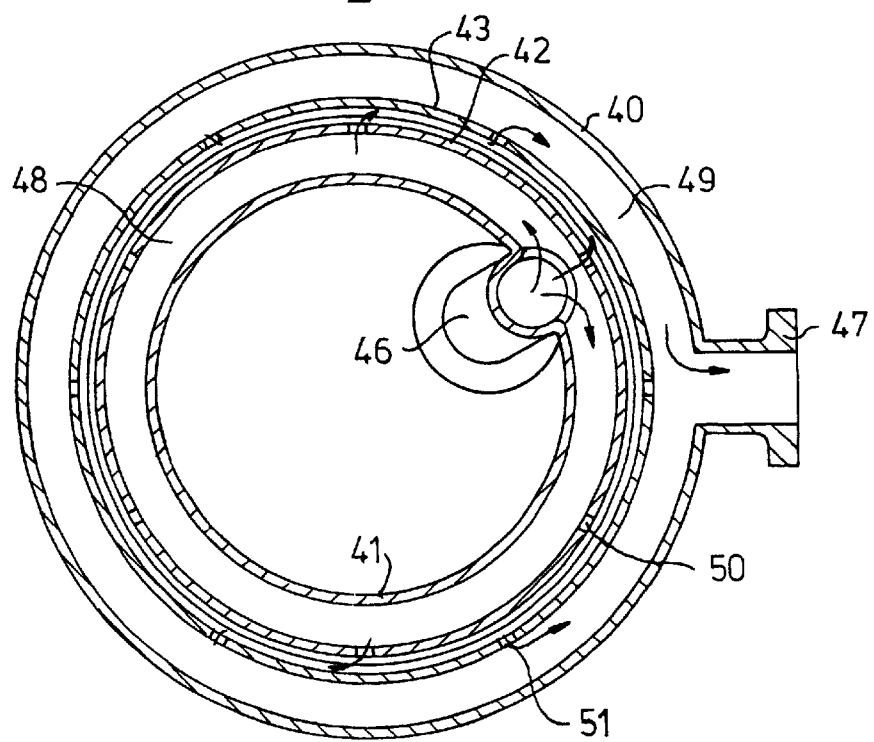
FIG. 6 shows a cross-sectional view in a radial plane of the swivel embodiment of FIG. 5.

In the highly preferred embodiment of the swivel according to the present invention as shown in FIG. 5 and FIG. 6, the inner ring 42 and the outer ring 43 are each connected to the inlet 46 or the outlet 47 via annular distribution chambers 48, 49. Via apertures 50 in the annular wall 42, hydrocarbons can pass from the inlet 46, to the inlet distribution chamber 48 and into the toroidal chamber 52. From the toroidal chamber 52, hydrocarbons pass through the apertures 51 in the outer annular wall 43, into the outlet distribution chamber 49. From the outlet distribution chamber 49, the hydrocarbons pass into the outlet 47. The distribution chambers 48, 49 are defined by the external surface 44 of the inner ring 42 and by the external surface 45 of the outer ring 43 respectively and by a curved enclosing wall 40, 41, preferably of semi-circular shape. The diameter A of the inlet 46 and the outlet 47 and the axial dimension F of the distribution chambers 48, 49 are larger then the diameter B of the apertures 50, 51. The axial dimension F is larger than the distance h between the seals 53, 54.

The upper and lower end parts 55, 56 of the enclosing walls 40, 41 of the inlet and outlet distribution chambers 48, 49 are connected to the outer ring 43 and to the inner ring 42 respectively, axially outwardly from the seals 53, 54 which are sealing the extrusion gap 57. Thereby the seals 53, 54 are located in the compression area on which the pressure in the distribution chambers 48, 49 acts on the inner and outer rings 42, 43. In this way an effective external pressurization of the inner and outer rings 42, 43 in the regions of the seals 53, 54 is achieved.

Although in the embodiment of FIG. 5, a toroidal chamber 52 is shown between the inner and outer rings 42, 43, this toroidal chamber 52 can also be replaced by a number of slots in each ring 42, 43 which are overlapping for different rotational positions of inner and outer ring 42, 43.

FIG. 7a schematically shows outer and inner rings 61, 62, a central toroidal chamber 67 and seals 63, 64 located on each side of the toroidal chamber 67, in the extrusion gap 68. Semi-circular enclosing walls 65, 66 are welded or brazed against the outer surface 59 of the outer ring 61 and to the outer surface 60 of the inner ring 62. The end parts 58, 58' of the enclosing walls 65, 66 have an axial dimension F, within which the sealing elements 63, 64 and the central toroidal chamber 67 are located. The pressure area of the central toroidal chamber 67 has an axial dimension h, which is substantially smaller than the axial dimension F of the distribution chambers, 69, 70. In this way the force exerted by the fluid in the chamber 67 remains relatively low and it is prevented that the sealing elements 63, 64 are being squeezed out of the extrusion gap 68.

As illustrated in FIG. 7a, the enclosing walls 65, 66 of the distribution chambers 69, 70 extend substantially along the complete height of the outer and inner annular rings 61, 62. Thereby the rings 61, 62, are in heat conducting contact with the hydrocarbons, and are thereby insulated from temperature fluctuations.

As is shown in FIG. 7b, deformation of the distribution chambers 69, 70 due to pressure fluctuations, will cause the rings 61, 62 to be slightly bent, such that at the position of the seals 63, 64, the gap width E will be decreased with respect to the gap width D at the location in which the enclosing walls 65, 66 are connected to the rings 61, 62.

As is shown in FIG. 7c, the inlets and outlets 72, 73, are located at a relatively large radial distance from the seals 63, 64. Hence deformation of the swivel near the inlet and outlet 72, 73 will not impair the sealing effect of the seal 63, 64.

As is illustrated in FIG. 7c, the enclosing walls 65, 66 are preferably of semi-circular shape such that distortions under pressure are minimized.

FIG. 8a schematically shows an embodiment wherein the outer and inner rings 61, 62 are substantially symmetric in the radial region C, but wherein the central chamber 67 itself is of asymmetric shape.

FIG. 8b shows a schematic embodiment wherein the enclosing walls 65, 66 of the distribution chambers are of dissimilar shape for the outer ring 61 and the inner ring 62.

FIG. 8c finally shows an embodiment wherein no central chamber 67 is present in the outer and inner rings 61, 62.

FIG. 9 shows an embodiment wherein the axial dimensions of the apertures 71, 71' in the outer ring 61 and the inner ring 62 are tapering when going from the outer surfaces 59, 60 of the rings 61, 62 towards the seal extrusion gap 68. In this way, the seals 63, 64 in the seal extrusion gap 68 can be placed together as close as possible. The pressure area between the seals is therefore as small as possible. The throughflow area of the apertures 71, 71' at the position of the outer surfaces 59, 60 can be of circular shape, whereas the throughflow area near the extrusion gap 68 can be of elliptical shape.

FIGS. 10a and 10b show a cross-sectional view along the line XIII—XIII in FIG. 9. As can be seen, the apertures 71, 71' have a funnel-like shape. The apertures 71, 71' are in fluid communication for each relative position of the outer wall 61 and the inner wall 62, as shown in FIG. 10b.

Figure 11:
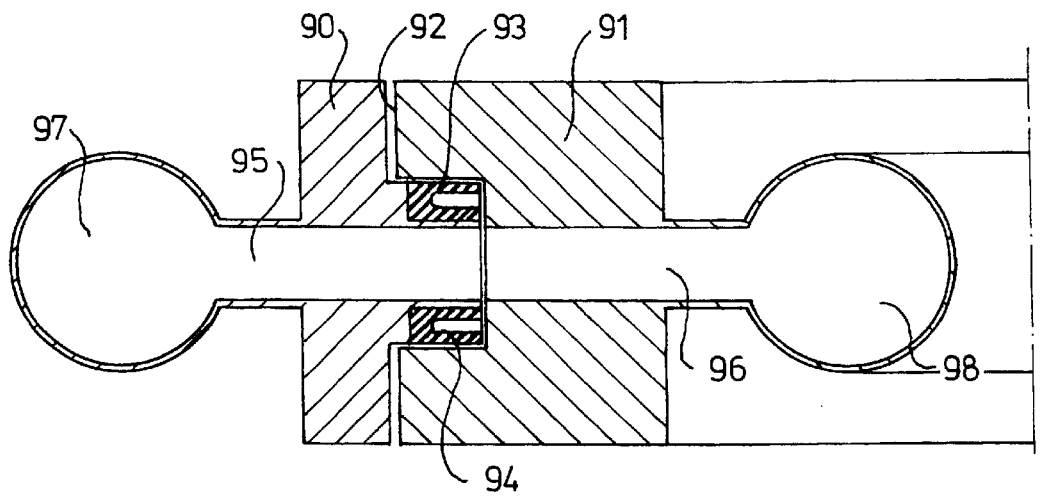
FIG. 11 shows an embodiment of the swivel according to the present invention comprising face seals.

Although the above embodiments have been described with sealing elements of the so-called "piston"-type, which are located along the length of the extrusion gap, the swivels according to the present invention can also be equipped with face-seals. This is shown in FIG. 11 in which two face seals 93, 94 are comprised in the extrusion gap 92 between the outer ring 90 and the inner ring 91. The apertures 95, 96 in the outer ring 90 and inner ring 91 axially extend between the face seals 93, 94 and connect to distribution chambers 97, 98.

Figure 12:
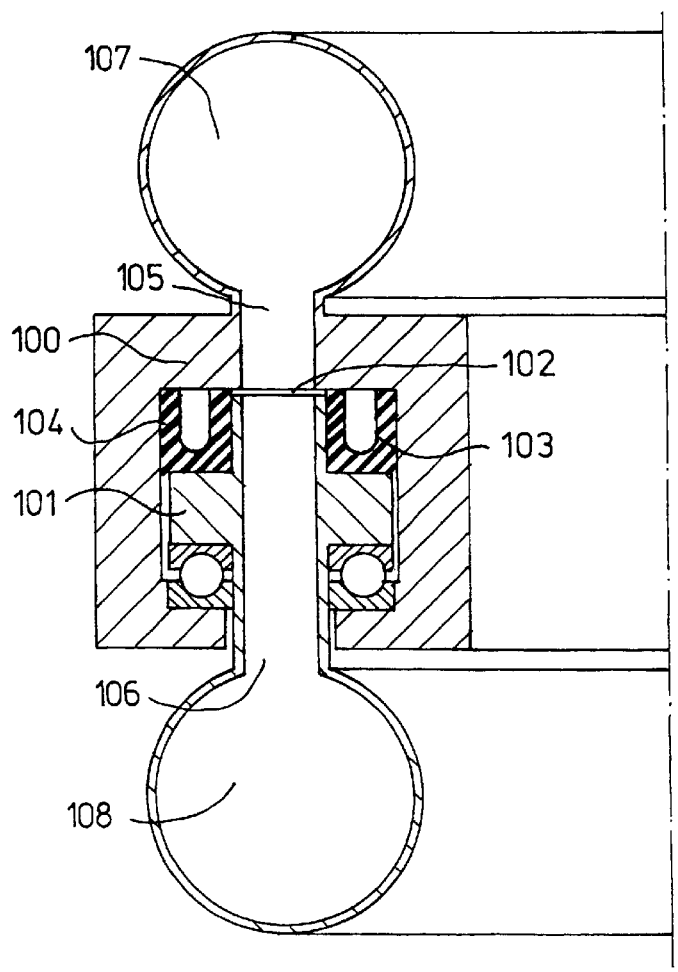
FIG. 12 shows an embodiment wherein the annular gap partly extends in a horizontal direction, the inner and outer rings being placed in a vertical arrangement.

FIG. 12 shows a further embodiment of a swivel according to the present invention, wherein the outer annular ring 100 is located vertically above the inner annular ring 101. The outer ring 100 extends around the inner ring 101. The seal extrusion gap 102 has a horizontally and a vertically extending part. The sealing elements 103, 104 are comprised in the vertical part of the seal extrusion gap 102. The rings 100, 101 are connected to respective distribution chambers 107, 108 via distribution ducts 105, 106.

Figure 13:
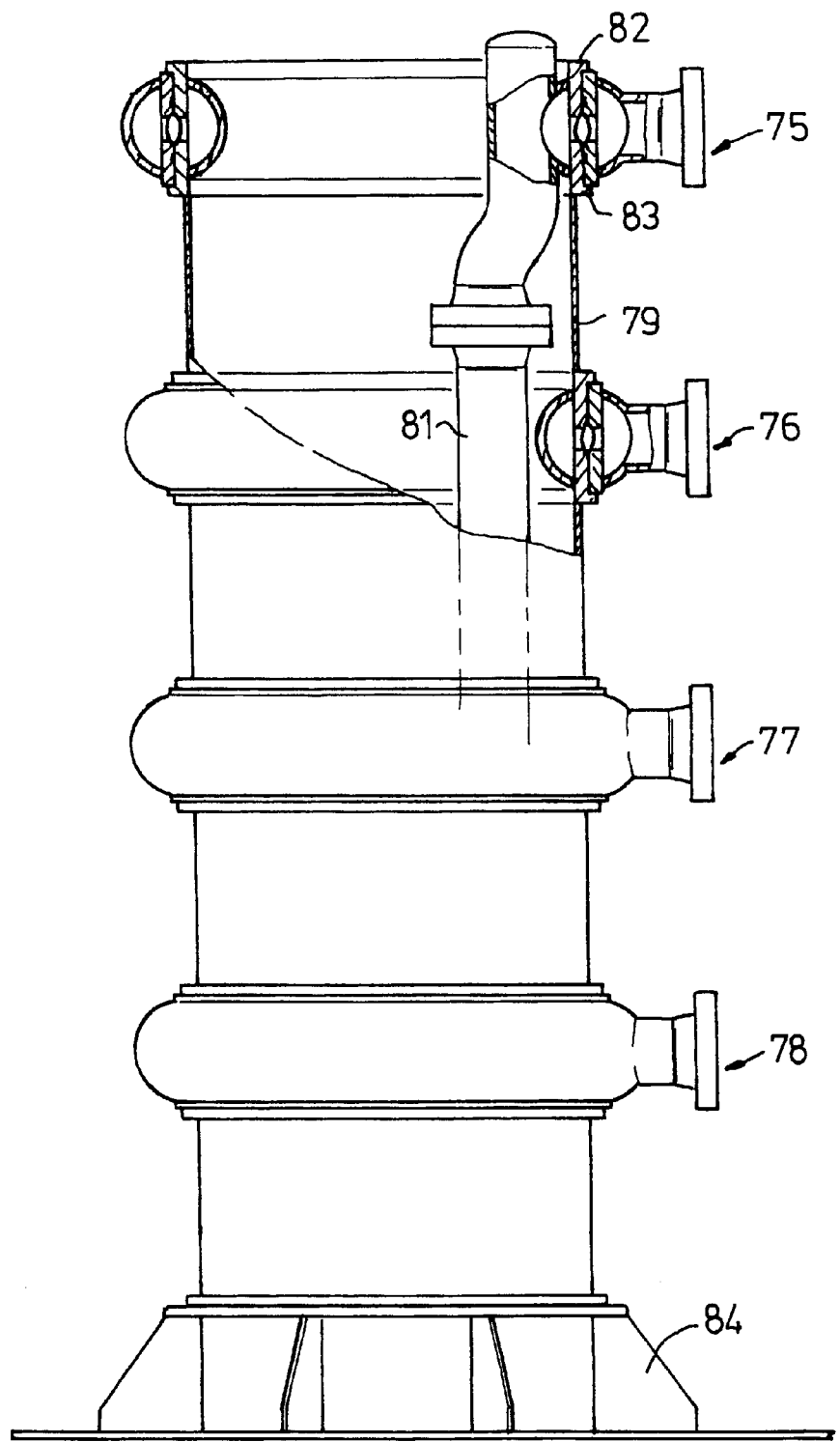
FIG. 13 shows a vertical swivel stack of swivel units according to the present invention.

FIG. 13 shows a vertical stack of four swivel units 75, 76, 77 and 78. Due to their small dimensions and relatively light weight, the swivels according to the present invention can easily be stacked. The supports 79 between each swivel unit and the foundation 84 can be of a simple and relatively light weight construction. The bearings 82, 83 of the inner and outer annular walls of each swivel unit can be relatively simple and may for instance be formed by slide bearings. Preferably the swivel units 75, 76, 77 and 78 are of identical shape and dimensions. Due to the relatively small space requirements of the inner and outer rings, the central space within the inner ring in which the inlet conduits 81 are located, is relatively large. Hereby, a large number of such conduits can be accommodated, and the swivel stack can consequently comprise many swivel units.

Figure 14:
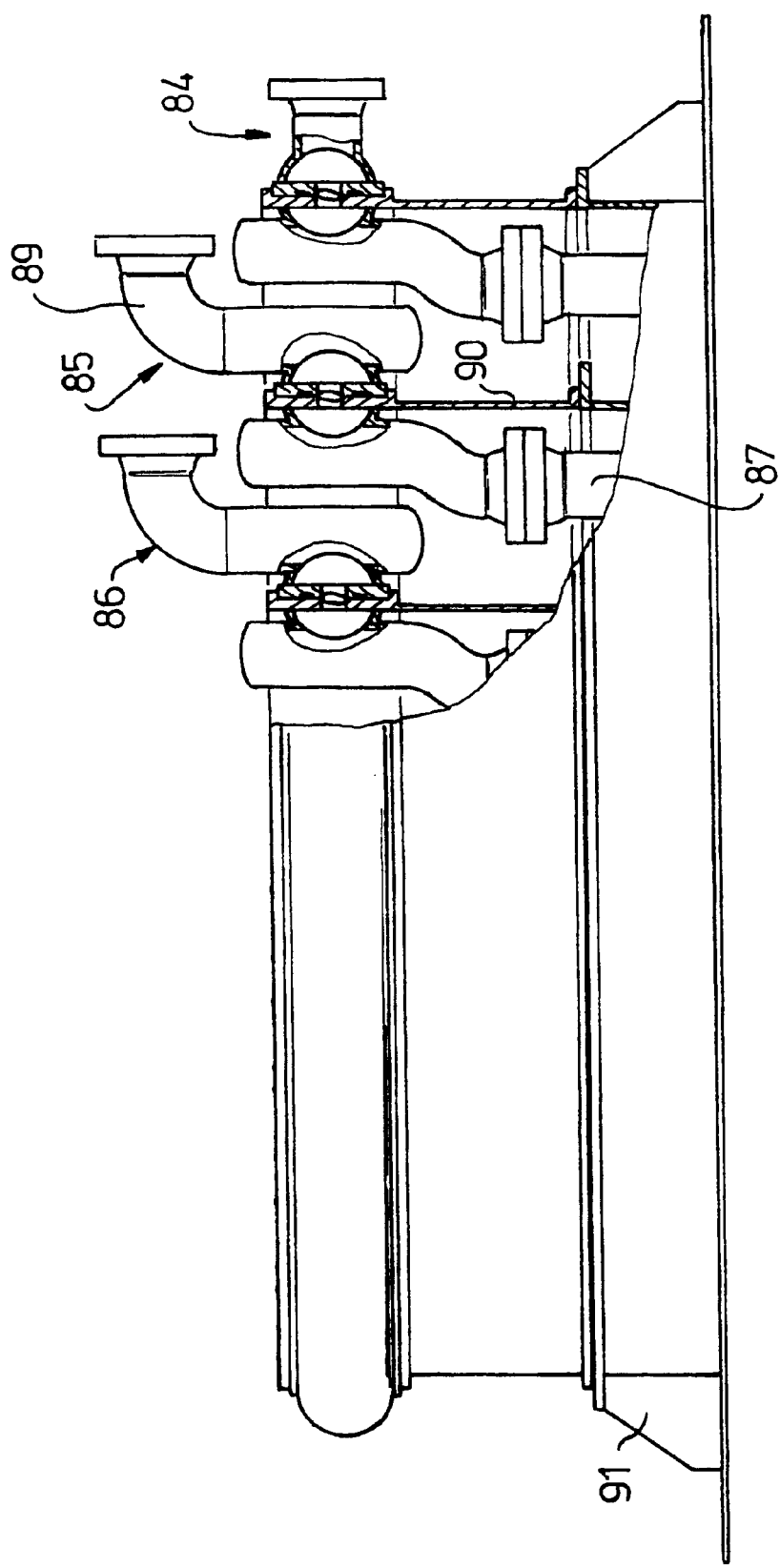
FIG. 14 shows a concentric arrangement of the swivel units according to the present invention.

FIG. 14 finally shows a swivel assembly in which three swivel units 84, 85 and 86 are concentrically placed. Each swivel unit comprises an inlet 87 and an outlet 89. The outlets 89 of the inner swivel units 85, 86 extend parallel to the top part of the inlet of the adjacent swivel unit 84, and 85 respectively and have a curved section for connecting to a horizontal discharge conduit. Each swivel unit 84, 85, 86 is placed on a relatively light weight annular support 90. The annular supports 90 are all connected to a common foundation 91.

What is claimed:

1. A swivel comprising:

an inner wall delimiting a central space and an outer wall concentric with said inner wall and rotatable relative to said inner wall, each of said inner and outer walls having an exterior surface and an interior surface;

a first distribution chamber within said inner wall and a second distribution chamber within said outer wall;

each of said inner and outer walls having a first aperture extending from said interior surface into a respective one of said first and second distribution chambers, said first apertures being in fluid communication with each other;

a fluid inlet and a fluid outlet;

a fluid duct extending in an axial direction through the central space in fluid communication with one of said fluid inlet and said fluid outlet;

a compensation arrangement for reducing variations in a distance between adjacent surfaces of the inner and outer walls due to a temperature difference between the inner and the outer walls; and each of said inner and outer walls having a second aperture extending from said exterior surface into a respective one of said first and second distribution chambers, each of said second apertures being connected to a different one of said fluid inlet and said fluid outlet, wherein the compensation arrangement comprises said first apertures having a smaller dimension in the axial direction than a diameter of a respective one of said fluid inlet and said fluid outlet.

2. The swivel according to claim 1, wherein said first apertures have a smaller dimension in the axial direction than said first and second distribution chambers.

3. The swivel according to claim 1, wherein each of said inner and outer walls comprises a plurality of said first apertures distributed along a periphery thereof.

4. A swivel comprising:

an inner wall that has an outer surface defining a central space and an inner surface opposite said outer surface;

an outer wall that is concentric with said inner wall and rotatable relative to said inner wall, said outer wall having an inner surface that faces said inner surface of said inner wall in close proximity and an outer surface opposite said inner surface of said outer wall;

a first distribution chamber that has one interior side that is said outer surface of said outer wall, said first distribution chamber being in fluid communication with one of a fluid outlet and a fluid inlet;

a second distribution chamber that has one interior side that is said outer surface of said inner wall, said second distribution chamber being in fluid communication with an other of said fluid inlet and said fluid outlet;

a compensation arrangement for reducing variations in a distance between adjacent surfaces of the inner and outer walls due to a temperature difference between the inner and the outer walls; and each of said inner and outer walls having an aperture that extends through said inner surfaces thereof into a respective one of said first and second distribution chambers, each said aperture being in fluid communication with said aperture of the other of said walls, each said aperture having an axial width that is smaller than a diameter of said fluid outlet.

5. The swivel of claim 4, wherein the inner and outer walls are generally rectangular in cross section.

6. The swivel of claim 4, wherein the inner and outer walls are annular walls generally rectangular in cross section.

7. The swivel of claim 5, further comprising two flexible sealing elements in an annular gap between said inner surfaces of said inner and outer walls, said annular gap extending in an axial direction on both sides of said apertures, one of said sealing elements being on each side of said apertures, each of said distribution chambers having an enclosing wall that connects to a respective one of said inner and outer walls beyond said sealing elements in axial directions from said apertures.

8. The swivel of claim 6, further comprising two flexible sealing elements in an annular gap between said inner surfaces of said inner and outer walls, said annular gap extending in an axial direction on both sides of said apertures, one of said sealing elements being on each side of said apertures, each of said distribution chambers having an enclosing wall that connects to a respective one of said inner and outer walls beyond said sealing elements in axial directions from said apertures.

* * * * *